United States Patent [19]

Hoyt

[11] 3,979,252

[45] Sept. 7, 1976

[54] APPARATUS FOR MANUFACTURING CELLULAR STRUCTURES

[75] Inventor: Edwin R. Hoyt, Everett, Wash.

[73] Assignee: The Hoyt Corporation, Everett, Wash.

[22] Filed: Dec. 21, 1973

[21] Appl. No.: 427,381

[52] U.S. Cl. ................................ 156/512; 156/197; 156/518; 156/548; 156/578

[51] Int. Cl.[2] ...................... B31D 3/02; B32B 31/18

[58] Field of Search ........... 156/512, 290, 250, 197, 156/548, 291, 495, 518, 563, 578

[56] References Cited

UNITED STATES PATENTS

| | | | |
|---|---|---|---|
| 2,597,868 | 5/1952 | Hogue et al. | 156/548 |
| 3,257,253 | 6/1966 | Hoyt | 156/256 |
| 3,413,177 | 11/1968 | Hoyt | 156/512 |
| 3,416,983 | 12/1968 | Steele | 156/512 |
| 3,477,893 | 11/1969 | Brazener et al. | 156/512 |
| 3,505,151 | 4/1970 | Sheridan | 156/512 |
| 3,518,151 | 6/1970 | Ellinor | 156/512 |
| 3,834,963 | 9/1974 | Hoffman | 156/291 |

*Primary Examiner*—Douglas J. Drummond
*Assistant Examiner*—M. G. Wityshyn
*Attorney, Agent, or Firm*—Stanley Bialos; Alvin E. Hendricson

[57] ABSTRACT

A method and apparatus of continuously producing a cellular structure wherein plies of flexible sheets are fed under tension, one through a glue station wherein precisely aligned longitudinal lines of adhesive are applied to a first face of one of the plies which are then adhered along said lines, followed by passing the resultant adhered plies as a web through a second station under tension where precisely aligned longitudinal lines of adhesive are applied to an exterior web face, and such web then fed as a continuous loop to intermittent web drive means. The web is intermittently fed into a cutting zone in precise increments and sheared to form successive strips that are forced into an assembly zone where the strips are adhered together to form an expandable cellular structure suitable for direct expansion and use as a honeycomb core. The loop provides a preformed unrestrained surge section ahead of the intermittent feed to accommodate in such section.

7 Claims, 16 Drawing Figures

FIG-11
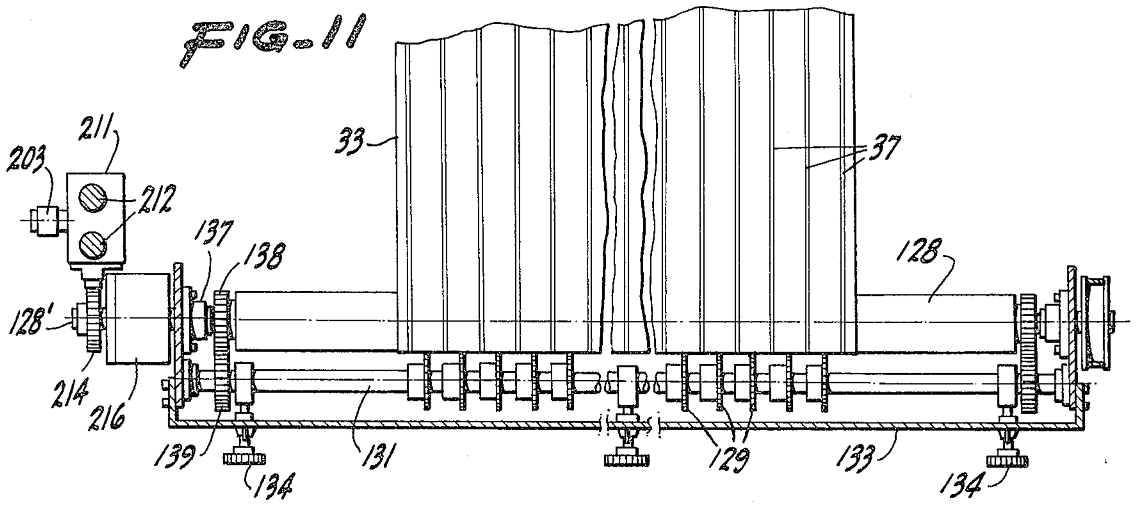
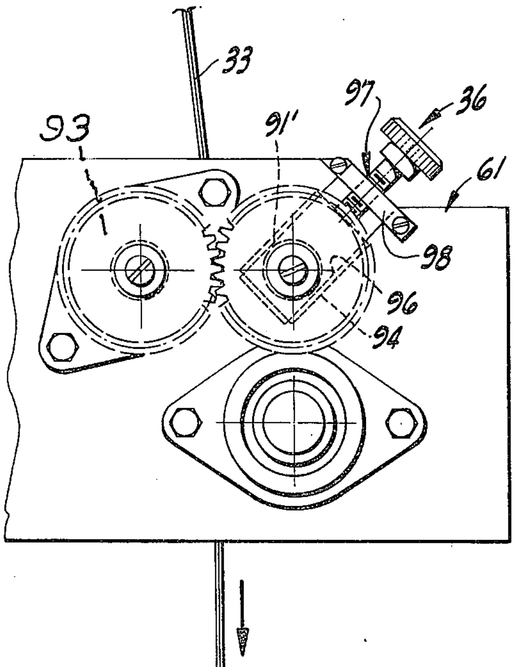
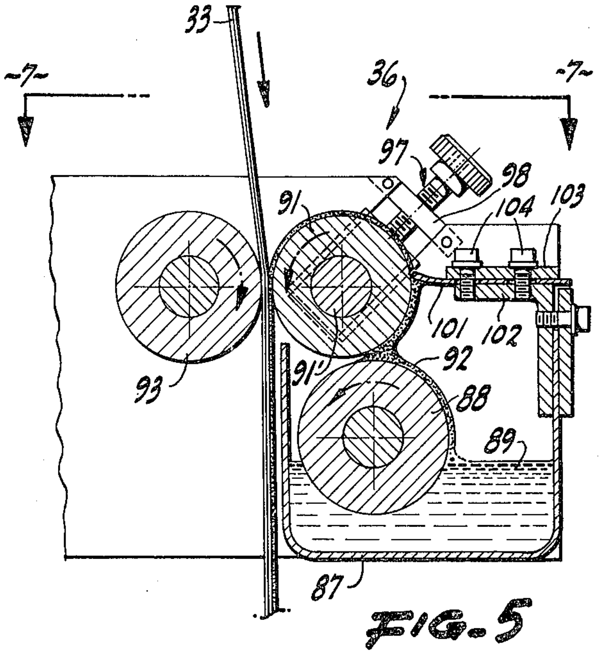
FIG-5
FIG-4
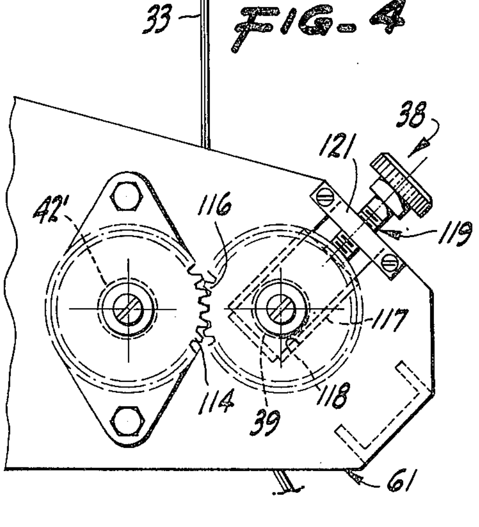
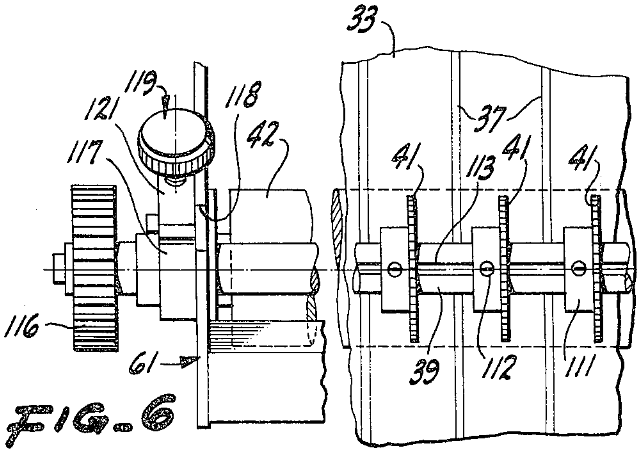
FIG-6

APPARATUS FOR MANUFACTURING CELLULAR STRUCTURES

BACKGROUND OF INVENTION

The structural properties of cellular structures have been investigated many years in the past. In addition to the wide variety of uses of cellular structures, there has been developed what is commonly termed a honeycomb structure wherein a generally cellular structure of a wide variety of configurations has been enclosed on open ends thereof with a sheet of material to form a composite structure that has a wide variety of applications. Although there have been proposed certain concepts regarding the continuous production of a honeycomb structure, the optimum in obtaining precision under high speed commercial operations has not heretofore been achieved.

In the manufacture of a cellular structure adaptable for use as a honeycomb core, for example, it is to be realized that two sheets of material are initially adhered together along lines of adhesion and then sliced or sheared into successive strips which are adhered together. The necessary slicing operation incorporates an intermittent operation while the adhesion of material is preferably accomplished continuously. It has been proposed in U.S. Pat. No. 3,035,952 for the entire operation to be performed intermittently, i.e., for the sheets of material to be intermittently moved through gluing and cutting operations. The difficulties and disadvantages of such an approach are believed apparent and, in fact, led to advancements of the sort illustrated in U.S. Pat. Nos. 3,307,440, 3,257,253 and 3,413,177, wherein the gluing or adhesive processing is carried on continuously and the cutting and packing operation is carried on intermittently.

The method and system of the latter patents is disadvantageous in requiring that a slack in the web formed of adhered sheets pile up or be kinked or form waves between some type of overrunning or intermittent feed means and cutting means. For many materials a system of this sort is undesirable as it must be realized that creasing, wrinkling, or otherwise forming flaws in the web of adhered sheets may adversely affect the end product.

An attempt at overcoming the difficulties of the aforementioned system is disclosed in U.S. Pat. No. 3,416,983 wherein a continuous gluing operation is carried out and the resultant web of adhered sheets is fed into an intermittent feed mechanism whereby slack in the web is developed between each cutting operation, and the intermittent feed mechanism removes the slack as the amount of web fed to the cutting mechanism. Such a system suffers from the disadvantage that the amount of web fed into the cutting mechanism for each periodic cutting operation is determined solely by the speed of the continuous gluing operation. It will be appreciated that, for any type of continuous cellular structure manufacture, it is necessary to provide sheets of material to be employed therein in very large quantities. Such quantities can normally be supplied only by rolling sheet material into very large rolls. Any type of drive mechanism withdrawing sheet material from large rolls can only provide minimal web speed control.

Consequently such a system or other prior art systems have been found to feed varying lengths of web formed of adhered sheets into a cutting zone so that successive strips cut from such a web are not of a uniform length (width with reference to the cell structure). The industry has thus become accustomed to the necessity of operating upon a compressed cellular core formed by continuous honeycomb core apparatus as by means of grinding, sanding or the like to produce a uniform core height from successive web strips formed by such apparatus. It will be appreciated that this additional processing is disadvantageous.

The present invention provides for the very precise application of lines of adhesion to sheets forming a web as the web is fed longitudinally in the direction of such lines, and application of adhesion lines to such web which is then precisely cut into identical segments that are adhered to form a compressed cellular structure. Feeding of the web of adhered sheets into a cutting zone is herein controlled entirely by an intermittent feed mechanism substantially without regard to the drive mechanism involved in the application of adhesion lines to the sheets and web of sheets. The foregoing is accomplished by the provision in the present invention of a web reservoir or surge section wherein a substantial length of adhered sheets forming a web ahead of an intermittent drive mechanism feeding the cutting zone, is provided and maintained in the form of a preformed loop with an extension or length greater than the distance from the last means relating to the adhesion process and the intermittent drive means. The length of the loop is substantially in excess of the web length removed by each cutting operation. Consequently the web of adhered sheets is never tensioned by the intermittent drive means which, in turn, then provides the only control over the amount of material of the web fed into the cutting zone for each periodic cutting operation.

SUMMARY OF INVENTION

The present invention comprises apparatus and method for the continuous production of a cellular structure which, for example, is suitable for use as the core of a honeycomb structure. The material employed in the present invention is a flexible material such as thin aluminum sheet, paper or the like. Such material is herein provided in the form of large rolls having an axle therethrough suitably mounted such that the material as separate sheets may be withdrawn therefrom continuously. A first sheet (ply) of material is drawn under tension from the roll thereof through a first adhesive applicator station for the application of precisely aligned and precisely dimensioned stripes of adhesive upon the sheet of material. This precision of adhesive application is attained first through the tensioning of the sheet of material drawn through the glue station and, secondly, through the application of adhesive to a roller and the wiping of adhesives therefrom by a doctor blade having precisely located indentations or slots therein and engaging the roller so as to wipe adhesive from the roller except for the lines of or stripes of adhesive applied to the sheet.

The other sheet (ply) is drawn under tension about a roller with the first sheet passing the roller so that the two sheets are adhered together along the precisely aligned and dimensioned adhesive stripes. A pair of drive rollers engage the two sheets forming the web and draw same from the rolls thereof through the foregoing and feed such a web into a second adhesive applicator station. The adhered sheets of material forming the foregoing web are tensioned in passage through the second glue station by tensioning means engaging the web so that the latter is maintained in tension in passage through the second adhesive station which operates in the manner of the first adhesive station to apply precisely dimensioned and precisely aligned glue lines or stripes to the outer face of the web formed of the previously adhered sheets or plies of material. The latter lines of adhesive are located between the first applied adhesive lines.

In a distinct departure from teachings of the prior art, the present invention then proceeds to provide an unrestrained loop of web having the aforementioned stripes of adhesive upon one outer face thereof that is fed by intermittent drive means into a cutting and assembly zone. In accordance with the present invention intermittent drive means provide sole control over and sole drive of the aforementioned web having stripes of adhesive upon an exterior surface thereof into cutting means. These intermittent drive means solely determine the amount of material fed into the cutting zone. Particular provision is provided in the present invention for operating the intermittent drive means and, because of the web reservoir or surge portion of the web between the tensioning means of the gluing operation and the intermittent drive means of the web, it is herein provided that the velocity of the sheet material and glued web need only be generally related to the intermittent drive means and web cutoff in the cutting zone.

Cutting of the web in the present invention is accomplished with extreme precision by means of a precisely movable cutter engaging a precisely located stationary cutter which is spring loaded to engage cut strips of the web to properly and identically align and engage successive strips.

There is then produced by the present invention a compacted cellular core structure or the like which has the upper and lower surfaces thereof in exact parallel planar relationship so as to particularly commend the end product to various further applications.

From the preceding it is seen that the invention hereof has its objects, among others, the provision of an improved method and apparatus for manufacturing cellular core structures from flexible sheet material, which are economical and can be conducted at high speeds with accuracy, wherein wrinkling of the sheet material fed to cutting mechanism for making cell strips is precluded to ensure core accuracy, cutting mechanism is maintained in close alignment, adhesive is applied accurately to the sheet material, and wherein adjustment of the spacing of adhesive lines can be readily and quickly made. Other objects of the invention will become apparent from the following more detailed description and accompanying drawings.

DESCRIPTION OF DRAWINGS

The present invention is illustrated as to a single preferred embodiment thereof in the accompanying drawings wherein:

FIG. 4 is a partial end elevational view illustrating drive means associated with an adhesive applying station of the present invention;

FIG. 5 is a central transverse sectional view through adhesive application means for the present invention;

FIG. 6 is a partial end elevational view of web tensioning means for the adhesive station of FIG. 4;

FIG. 11 is a segmented sectional view taken in the plane 11—11 of FIG. 9;

DESCRIPTION OF PREFERRED EMBODIMENT

Figure 1:
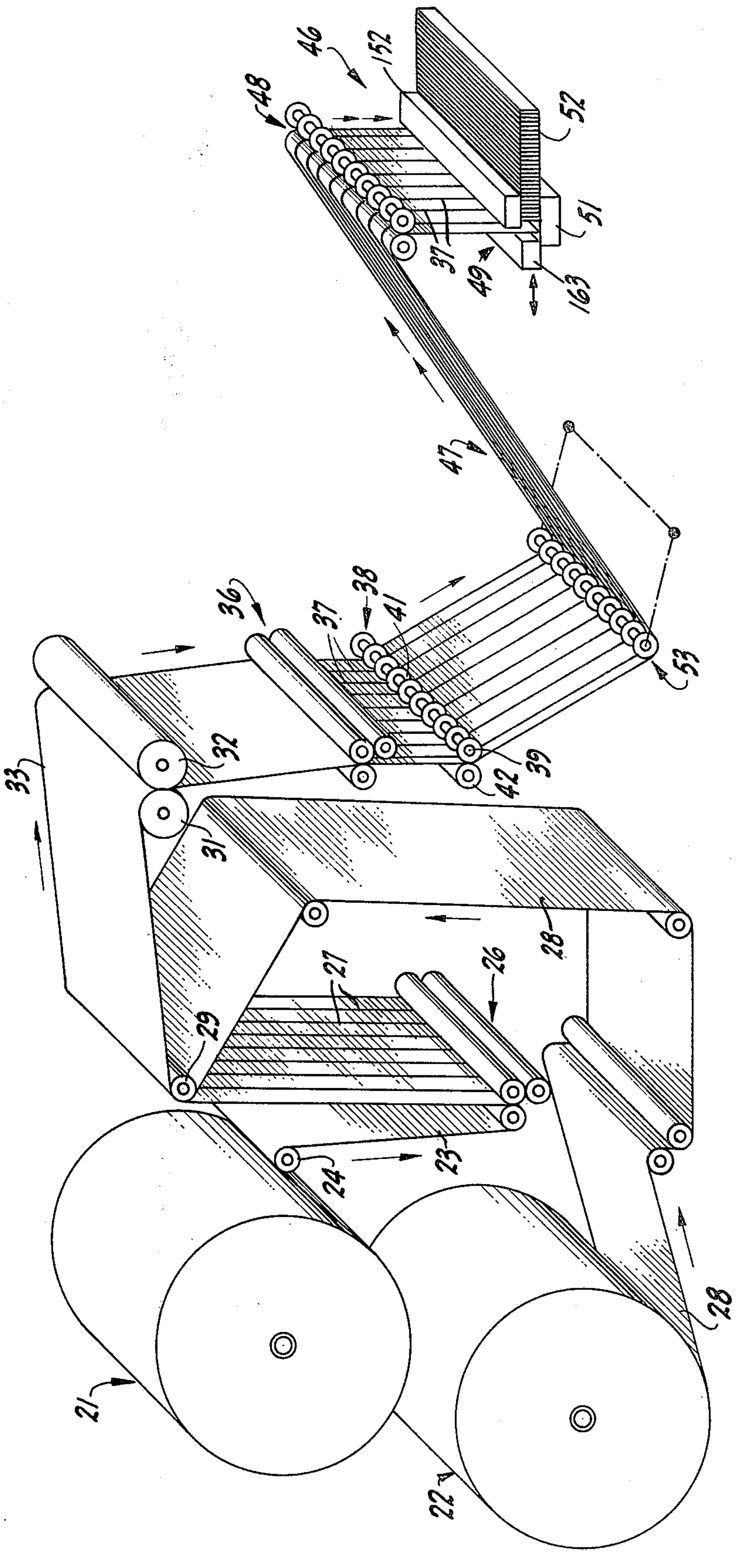
FIG. 1 is a schematic isometric projection of an overall system in accordance with the present invention.

The overall system of the present invention is schematically illustrated in FIG. 1 and, referring thereto, it will be seen that there are provided a plurality of at least two supply rolls 21 and 22 of material to be employed for the manufacture of honeycomb core. The materials of the rolls 21 and 22 are flexible and may comprise any of a wide variety of materials from paperboard or plastic to metal foil sheets. Material withdrawn from the upper roller 21 as a first sheet 23 passes over an idler roller 24 and is then drawn through a first adhesive station 26. At this adhesive station there are applied parallel spaced apart lines (in the form of stripes) of adhesive 27 along a first face of the sheet 23. Material withdrawn from the lower roller 22 as a second sheet 28 is directed about a number of idler rollers and thence about an idler roller 29 directly against the surface of such roller. The first sheet 23 is directed over the idler roller 29 atop the second sheet 28 with the lines of adhesive 27 facing the second sheet.

The sheets 23 and 28 are drawn through the paths described above by means of a pair of drive rollers 31 and 32 between which passes the laminated web 33 comprised of two plies 23 and 28 with the lines of adhesive 27 therebetween. The rollers 31 and 32 are preferably covered with a resilient material, such as rubber, and one of these rollers is mechanically driven with the other idling so as to draw the web 33 therebetween. It will be seen at this point that the plies 23 and 28 have been glued together along parallel longitudinal lines 27. It is provided in the present invention that these adhesive lines 27 shall be very precisely dimensioned both as to thickness and spacing for reasons described below and in the manner further described below. The rollers 31 and 32 maintain the web 33 and sheets 23 and 28 comprising same in tension through the traverse thereof from the rolls 21 and 22.

Following the drive rollers 31 and 32, there is provided a second adhesive station 36 which is shown to be disposed almost directly below the drive rollers. This adhesive station 36, as further described below, applies parallel spaced lines of adhesive 37 upon an outer face of one of the plies of the web 33 which will be seen to also comprise the second face of the first sheet 23 of the web. Such lines of adhesive 37 are located between adhesive lines 27 in staggered relationship. As previously noted, the present invention provides for precisely delineating the width and spacing of adhesive lines and furthermore provides for precisely controlling the spacing therebetween and, to this end, there is herein provided tensioning means 38 on the opposite side of the adhesive station 36 from the drive rolls. These tensioning means may be comprised as a driven shaft 39 having discs 41 thereon and pressing the web 33 between adhesive lines 37 against a rotary mounted roller 42. Driving discs 41 are driven at a slightly faster peripheral speed than the speed of the web 33 as determined by the drive rolls 31, 32 to pull the web slightly as the discs slip over the web to thus maintain the tension on the web to obtain accurate application of the adhesive lines. The tension should not be so great as to tear the web but sufficient to maintain the web taut. A suitable speed is about 3 to 5% greater than the speed of the web but this is not critical.

There is additionally provided as a portion of the present system a cutting and assembly station 46 to which the web is directed through what may be termed a web reservoir 47 for reasons which will become clear from the following description. The cutting and assembly station 46 includes intermittent drive means 48 through which the web is passed for positive movement in desired increments into cutting means 49. These cutting means 49 include horizontally reciprocating elements together with a precisely adjustable end blade or assembly plate 51 for successively shearing predetermined lengths of the web therefrom and together cooperating to press together these successive slices of the web for forming an expandable cellular structure 52 (FIG. 14) that may be employed as a cellular honeycomb core.

Figure 2A:
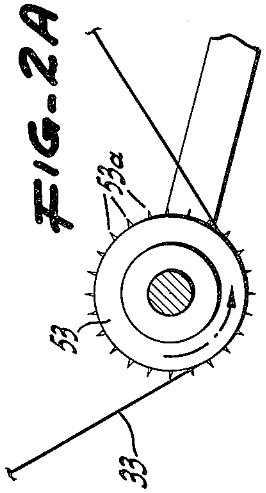
FIG. 2A is an enlarged partial end view of the dancer roll of FIG. 2.

The web leaving the second adhesive station 36, described above, is moving at a continuous constant speed rate; however, the station 46 utilizes the web in an intermittent or variable fashion. Consequently the present invention provides a generally horizontally extending loop or the like of web to form a web reservoir section 47. A pivotally mounted dancer roll or the like 53 may be employed in conjunction with this web reservoir section to enhance alignment of the web in passing from the second adhesive station to the station 46. As shown in FIG. 2A, dancer roll 53 may carry needle projections 53A thereon to perforate the web, so that should a resin type adhesive be employed, gases from the adhesive may vent from the cell structure in a heated press by which planar sheets are bonded to the upper and lower faces of the cells in a conventional manner (not shown). Thus, possible damage to the cellular core structure by gas pressure is obviated.

The general sequence of operations of the present invention has been set forth above, together with brief note of apparatus employed in the system. It is particularly noted that the present invention is directed to the precise application of adhesive to continuously moving sheets of material and the very precise cutting at high speed operation of a laminated web formed of such sheets to produce a cellular structure of exact predetermined dimensions requiring no further edge processing for ultimate utilization. Additionally the cellular structure formed by the present invention is capable of expansion into precisely determinable configuration, particularly a true hexagonal shape. The foregoing general or overall description of the present system does not attempt to identify particularities whereby the present invention achieves the precision of operation necessary to achieving major objects of the present invention. Reference is now made to mechanisms of the present invention and, in this respect, attention is directed first to FIGS. 2 and 3 of the drawings. The supply rolls 21 and 22 are similarly mounted upon a rigid frame 61 which may take a variety of configurations such as that illustrated. The roll 21, for example, has an axle extending therethrough with adjusting means 62 provided to align the roll with the frame and subsequent rollers of the mechanism so that the sheet unrolled therefrom will pass in alignment over and between the various rollers. This alignment means may, for example, include a pivotally mounted bearing at one end of the roller shaft and perpendicularly mounted handwheel mountings of bearing and shaft at the opposite end of the latter. It is noted in this respect that these adjusting means may be made quite small and light of weight if they are designed only to adjust the roll when it is in motion. The roll 21 is braked so as to resist unwinding of the sheet 23 therefrom and this may be simply accomplished by extending a wide weighted belt 63 thereover, as indicated. The roll 22 is similarly adjustably mounted and braked.

Figure 3:
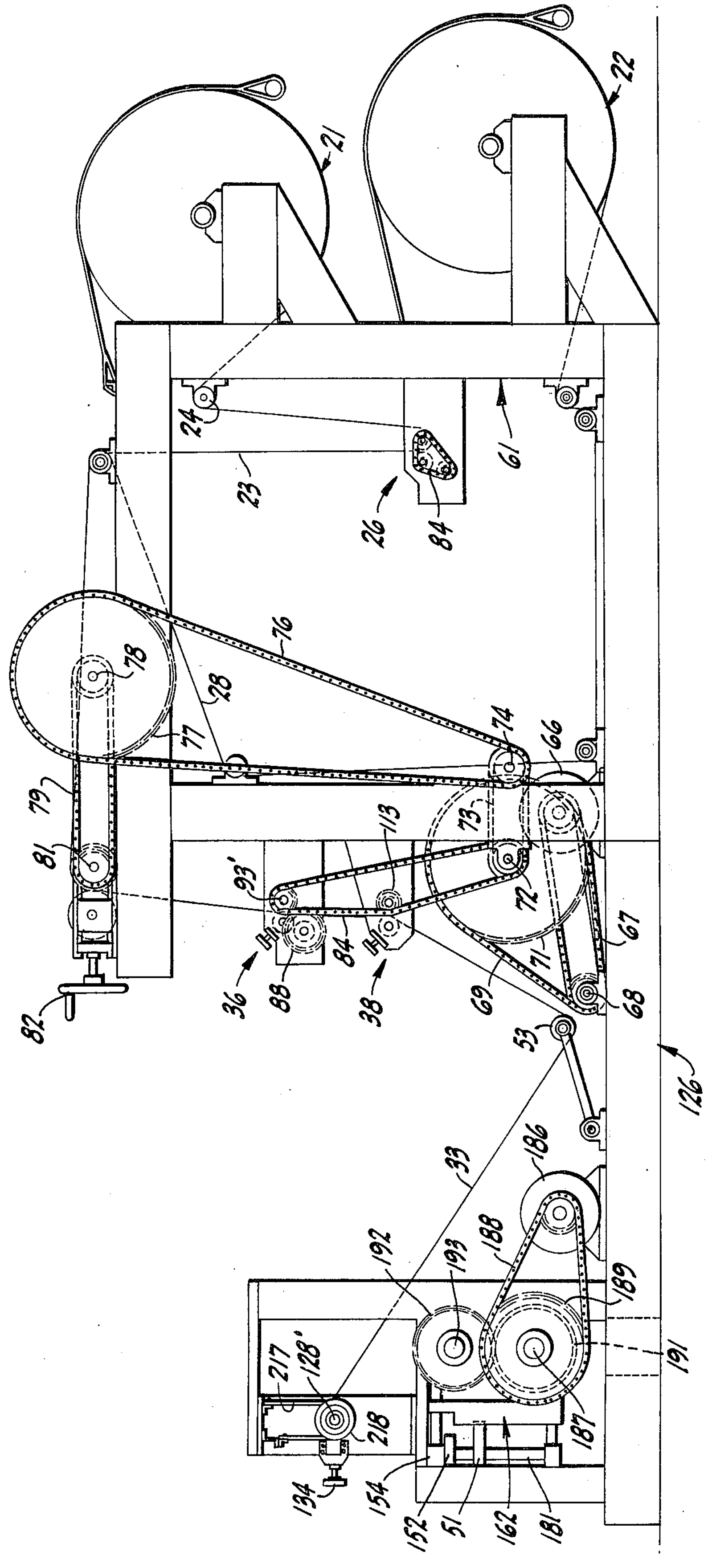
FIG. 3 is a side elevational view of the embodiment of FIG. 2 and taken on the opposite side of such embodiment.
Figure 7:
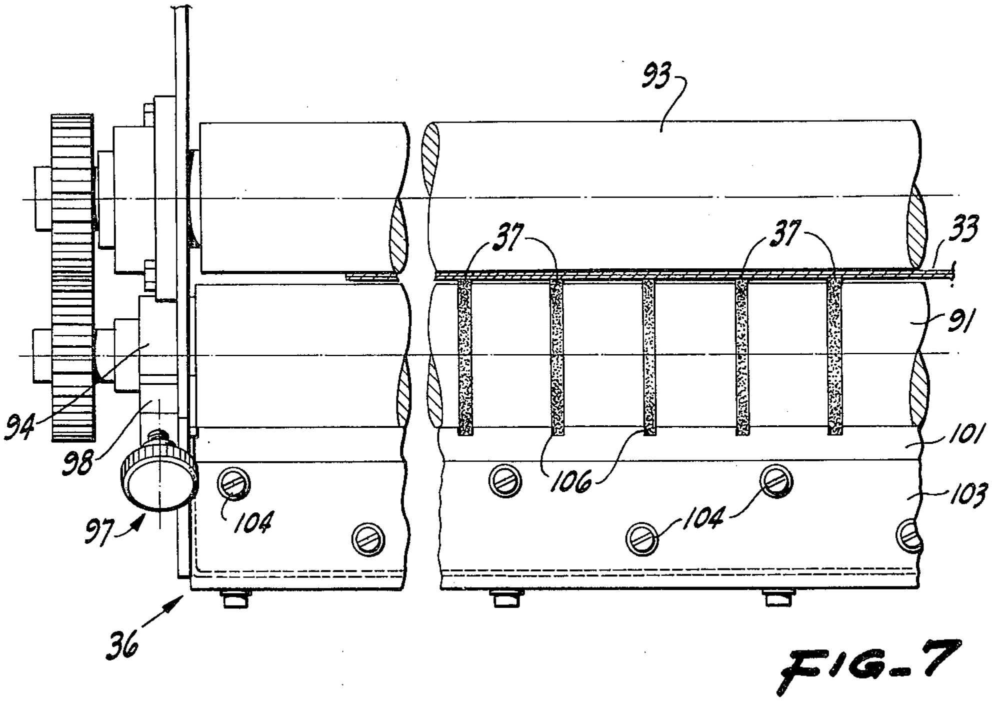
FIG. 7 is a partial plan view of the adhesive applicator of FIG. 5 taken in the plane 7—7 of FIG. 5.

The system of the present invention provides for driven rotation of certain rolls and the like and, in this respect, reference is made to FIG. 3 wherein there is illustrated a variable speed motor 66 mounted on the frame 61. Various different mechanical drive systems may be employed herein; however, the illustrated embodiment includes the sprocket chain connected to a sprocket on the end of the motor shaft and extending about a sprocket on an idler shaft 68 having another sprocket thereon with a chain 69 thereabout driving a large sprocket wheel 71. This large sprocket wheel 71 is mounted on a drive shaft 72 connected by a chain drive 73 to an idler shaft 74 having a chain 76 extending about a large sprocket wheel 77 at the top of the frame 61. This upper sprocket wheel or gear 77 is mounted on a rotatable shaft 78 with a small sprocket wheel thereon connected by a chain 79 about a sprocket wheel on the web drive shaft 81 carrying the web drive roll 31. The idler roll 32 of the web drive has the shaft thereof mounted in adjustably positioned bearings that may be controlled by handwheel 82 for setting the pressure between the rolls 31 and 32.

Provision is also made herein for driving a roller of the second adhesive station 36 and also for driving tensioning means 38. This is accomplished by a chain drive including a sprocket chain 84 extending about a sprocket wheel on the shaft 72 and about sprocket wheels of the adhesive station and tensioning means, as described below. The drive system for the cutter and assembly station 46 is separately described below in connection with a description of this station. It will be seen that insofar as the adhesive application is concerned and the formation of the web with adhesive lines thereon leaving this portion of the equipment, a single variable speed motor 66 is provided. The drive rolls 31 and 32 withdraw the sheets from the rolls 21 and 22 and provide for adhering these sheets along lines of adhesion and the tensioning means 38 provide for drawing the web formed as above through the second adhesive station under tension. The first adhesive station 26 is not externally driven but, instead, is driven by the sheet 23 drawn therethrough. In this respect it is noted that the sheet 23 is drawn from the bottom of the roll 21 and thence up over the idler 24 so as to pass downwardly and about a first roller of the first adhesive station 26. The sheet wraps around about 180° of this roller so that the moving sheet as driven by the rolls 31 and 32 rotates this first roller of the first adhesive station. Each of the rollers of the first adhesive station has a sprocket wheel on the end of the shafts thereof and a chain 84 interconnects same so that all of the rollers of the first adhesive station are, in fact, rotated by the sheet 23 passing through the station. Other than the differences in drive, the first and second adhesive stations are substantially identical and, in this respect, reference is made to the following description of the second adhesive station.

The second adhesive station is illustrated in FIGS. 4 to 7 and, referring thereto, it will be seen that there is provided a liquid glue reservoir 87 in the form of a trough or the like within which there is mounted for rotation a fountain roller 88. A suitable liquid adhesive 89 of the type employed for bonding paperboard plies is disposed within the reservoir 87 so that rotation of the fountain roller 88 coats the surface thereof and lifts a coating of adhesive or glue 89 from the reservoir. Immediately above the fountain roller 88 there is mounted a glue roller 91 slightly out of contact with the fountain roller, as illustrated. Counterclockwise rotation of the rollers 88 and 91 will cause a film 92 of liquid adhesive to be carried upwardly by the fountain roller and to be transferred to the upper or glue roller 91. The thickness of film of adhesive or glue upon the glue roller 91 and also the lateral disposition of glue lines on the glue roller 91 are precisely controlled in the glue station by means shortly to be described. There is additionally provided in the glue station a further or third backing roller 93 mounted for rotation in parallelism with and substantially horizontally aligned with the glue roller 91. The web 33 passes through the glue station generally vertically between the rollers 91 and 93, as illustrated in FIG. 5, for application of glue lines to the web by the glue roller 91.

Considering now the drive of the elements of the glue station and referring to FIGS. 3 and 4, it will be seen that the drive chain 84 for the second glue station engages sprockets on the shafts of rollers 88 and 93 so that both of these rollers are driven from the motor 66. At the opposite end of the glue station, i.e., the other side of the frame 61, the rollers 91 and 93 are geared together, as shown in FIG. 4. Thus, each of the rollers 88, 91 and 93 of the glue station rotates in synchronism with the rollers 88 and 91 rotating in the same direction, i.e., counterclockwise in FIG. 5, and the backup roller 93 rotates in a clockwise direction, as viewed in FIG. 5. The spacing between glue roller 91 and the other rollers 88 and 93 of the glue station is adjustable. The roller 91 has the shaft 91' thereof mounted in bearing blocks 94 which have side pieces fitted into inclined slots 96 in the frame 61 or an extension thereof with the axes of these slots being perpendicular bisectors of the plane between the axes of the rollers 88 and 93. Thus, the roller 91 may be moved equally toward or away from the rollers 88 and 93 and, to this end, there are provided setscrews 97 threaded through bars 98 attached to the frame across the slots 96 and rotatably engaging the bearing blocks. Rotation of the setscrews will thus move the roller 91 in and out relative to the other rollers of the glue station.

Roller 91 is the applicator roll; and application of glue or adhesive to the web 33 at the glue station is accomplished in a very precise manner and contrary to the general manner of glue application to webs. In accordance herewith there is provided as a portion of the glue station a doctor blade 101 adapted to be securely mounted on the reservoir or trough 87 behind the glue roller 91. This mounting may, for example, include a base sprocket 102 secured to the backside of the reservoir 87 and adapted to have the blade 101 disposed along the top thereof. A locking plate 103 is then disposed atop the blade 101 and is secured to the base bracket by bolts 104 extending through the locking plate into threaded engagement with the base bracket 102 through openings in the blade. As particularly illustrated in FIGS. 5 and 7, the base bracket 102 and locking plate 103 are rigid structural members extending entirely across the glue station and a large plurality of locking bolts are employed so that the plate 101 is very firmly anchored in desired position.

Further with regard to doctor blade 101, it is noted that same is intended to bear upon the surface of the applicator roller 91. The glue station 36 is adapted to provide upon the web 33 a plurality of lines of adhesive applied by the roller 91. It is of particular importance that these lines of adhesive be precisely dimensioned laterally thereof and also be precisely positioned with respect to each other. This can only be accomplished by providing upon the surface of the roller 91 precise glue lines of adhesive. This is herein accomplished by utilizing a full roller 91 which is machined to close tolerance and formed of steel, for example, and by employing the plate 101 to remove from the surface of the applicator roller 91 all glue or adhesive beyond that intended for the lines of adhesive applied to the web. To this end the plate 101 is provided with precisely located indentations or edge slots or notches 106 (FIG. 7) extending inwardly of the plate on the edge engaging the glue roller 91. These slots 106 are precisely machined in the plate 101 relative to the ends thereof and the plate is precisely positioned on the base bracket 102 by the bolts 104 so that the exact location of the slots 106 longitudinally of the glue roller 91 are precisely set. Openings in the plate 101 for the bolts 104 are exactly the width of the bolts longitudinally of the plate; however, these openings are slightly elongated laterally of the plate so that same may be adjusted toward or away from the glue roller 91 before the bolts are tightened.

Considering further the application of glue lines to the web 33, it is noted that a film of glue is carried by the glue roller 91 upwardly from the fountain roller 88 and the plate 101 engaging the glue roller removes all of this film of glue except that which passes through the slots 106. This then precisely locates glue lines along the roller 91. The depth of the slots 106 determine the amount of glue applied along each glue line on the roller.

It has been noted above that the plate 101 engages the surface of glue roller 91 as the latter rotates so as to remove from such surface all glue or adhesive except that which is passed by the slots or indentations 106 in the plate 101. As a matter of practice of the present invention, certain adjustments are normally made at each glue station in order to appropriately apply glue lines to a sheet or web passing therethrough. Considering the second glue station illustrated in FIG. 5, for example, it is noted that the position of roller 91 is first adjusted to allow a clearance between roller 91 and roller 93 substantially equal to the thickness of the web 33 passing therebetween. In this position the plate 101 is mounted to touch the periphery of glue roller 91 slightly above the center thereof. In other words, the mounting bracket 102 is so positioned that placement of the plate 101 thereon directs the plate toward glue roller 91 slightly above the center thereof. With the plate 101 firmly secured in this position, the glue roller 91 is then retracted from roller 93 (and thus also from roller 88) an amount substantially equal to the thickness of adhesive or glue to be applied to the web.

Glue roller 91 does not physically engage the web but, instead, the glue lines or lines of adhesive upon the glue roller 91 are placed in contact with the web by the rotating glue roller. This retraction is measured initially by a gauge so that by backing off the thumbscrew or setscrew 97 appropriate position of the glue roller is attained. This retraction of the glue roller then moves such roller in part toward the plate 101 to consequently slightly deflect the plate 101 upwardly, as indicated in FIG. 5. The indication in FIG. 5 is somewhat overemphasized in order to indicate the condition of plate 101 in the position for operation of the glue station. It will be seen that the plate 101 actually rides upon the surface of the glue applicator roller 91 with the pressure being exerted between the outer edge of the plate and the periphery of the glue roller. This then ensures complete removal of all excess adhesive from the surface of glue roller 91 and, furthermore, extends the longevity of any particular setting of the plate 101.

Whatever wear may occur between the outer edge of the plate 101 and the surface of glue roller 91 will be compensated for by the deflection of the plate against the glue roller so that extended periods of operation of the glue station are possible without any conceivable passage of extraneous adhesive about the glue roller to be applied to the web. In practice the plate or blade 101 is formed as a thin steel plate precisely machined as to edges, slots and openings for the bolts 104. In this manner and with the particular mounting and adjustments described above, the glue station provides for precise application to the glue roller 91 of glue lines to be applied to the web 33. This particular glue station configuration is highly advantageous over conventional glue application systems for the utilization of rotary discs, as is conventional, can only result in a spreading of adhesive upon the passing web. Additionally, adhesive carried by a thin rotary disc tends to slump much more than adhesive carried by an uninterrupted roller so that the width of glue line applied to the web in conventional systems is less closely controlled than in the present invention.

The provision of the detachably mounted doctor blade 101 provides easy and quick adjustment of the spacing between glue lines for different size cellular structures, because all that need be done is to replace an entire blade with the desired spacing of the notches, instead of having to replace or adjust individual adhesive applicator rolls.

As noted above, the first and second glue stations are substantially identical except for the manner of drive thereof. Thus, the first glue station 26 also includes a fountain roller, glue roller and backing roller, together with a precisely machined and rigidly mounted indented plate for precisely applying glue lines to the glue roller which are then precisely applied to the passing sheet or web. For many applications, such as those noted above, the precise location of and control over the width of glue lines upon a sheet or web passing through a glue station is extremely important. Prior art devices and systems are not all to be desired for providing this precision of adhesive application.

As previously related, a further important feature of the present invention provides tensioning means 38 for the purpose of drawing the web 33 under tension through the second glue station 36. As noted above, the drive rolls 31 and 32 cause the sheet 23 to be drawn under tension through the first glue station 26 and in many respects this is conventional. However, it is particularly provided herein that the web 33 shall be drawn under tension through the second glue station 36 rather than allowing the web to merely pass through this station. Here again the precision of application of lines of adhesive to the web is considered to be of major importance to the end product. In this respect attention is invited to FIGS. 4 and 6 wherein the tensioning means 38 are illustrated.

The tensioning means 38 includes, as noted above, a roller 42 across which the web 33 passes and discs 41 engaging the web and forcing the same against the roller 42. The discs 41 each have a knurled or serrated periphery to grip the web and there is provided one disc between each of the glue lines 37. These discs 41 are mounted upon the shaft 39 by means of collars 111 secured one to each disc and each having a setscrew 112 threaded radially therethrough for extension into a slot 113 in the shaft 39. In this manner the longitudinal positioning of the discs 41 upon the shaft 39 may be adjusted so that there is, in fact, provided one disc between each pair of glue lines 37 on the web 33. The drive roller 42 has the shaft 42' thereof extending through bearings mounted upon frame extensions with a sprocket wheel 113 engaging the drive chain 84 so that the roller 42 is positively driven at a known rotational velocity. On the opposite end of the shaft 42' there is mounted a gear 114 which meshes with a gear 116 on the shaft 39 so that the roller 42 and discs 41 are rotated at the same velocity in opposite directions to place tension in the web 33 therebetween.

As noted above, the web 33 passes between the roller 42 and discs 41 and, in order to control the force applied to the web by the tensioning means 38, the shaft carrying the discs 41 is adjustably mounted in the frame or extension thereof. To this end the shaft 39 is mounted in bearing blocks 117 which have side extensions slidably engaging inclined slots 118 in the frame. Adjusting screws 119 at opposite ends of the shaft 39 rotatably engage the bearing blocks 117 thereof and are threaded through bars 121 secured to the frame so that rotation of the setscrews move discs 41 toward or away from roller 42. It is noted in this respect as well as with regard to the glue station gear drive described above, the movement of discs 41 carried by shaft 39 is quite small in relation to the depth of the gears 114 and 116 so that these gears at all times remain in engagement.

In the illustrated embodiment of the present invention the web 33 is slightly wrapped around the discs 41. These discs are driven, as described above, and in accordance with the present invention the peripheral velocity of the discs 41 is at least as great as and is preferably slightly greater than the rate of travel of the web 33 determined by main drive rolls 31 and 32. This then provides for the application of tension to the web 33 as it passes through the second glue station 36. Such tensioning of the web at the second glue station prevents any possible misalignment of the web or misplacement of the glue lines 37 on the web. Again it is noted that this precise location or positioning of glue lines upon the web is highly advantageous, as further described below.

Figure 8:
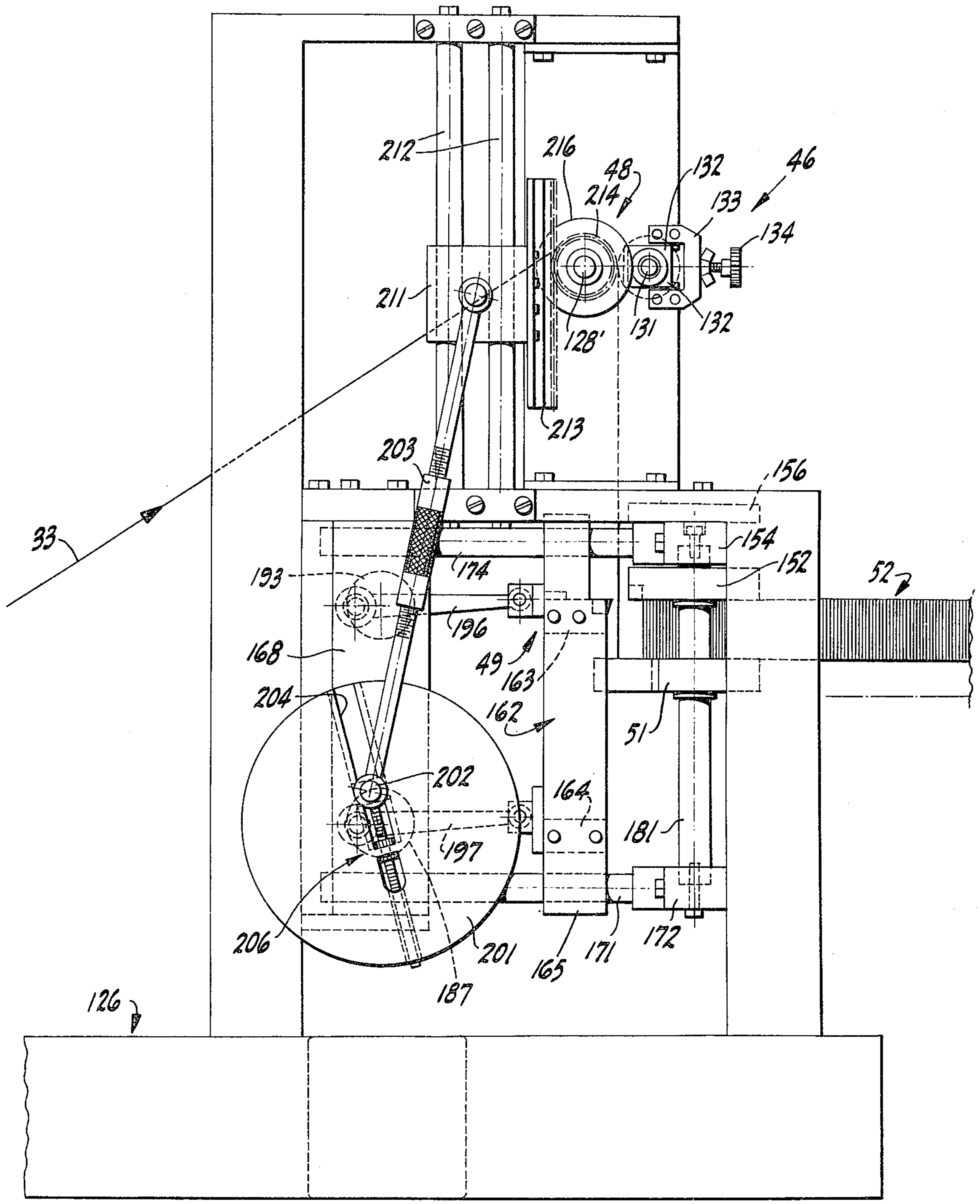
FIG. 8 is an enlarged side elevational view of the cutting and assembly station of the present invention and particularly illustrating intermittent web drive means of the present invention.
Figure 9:
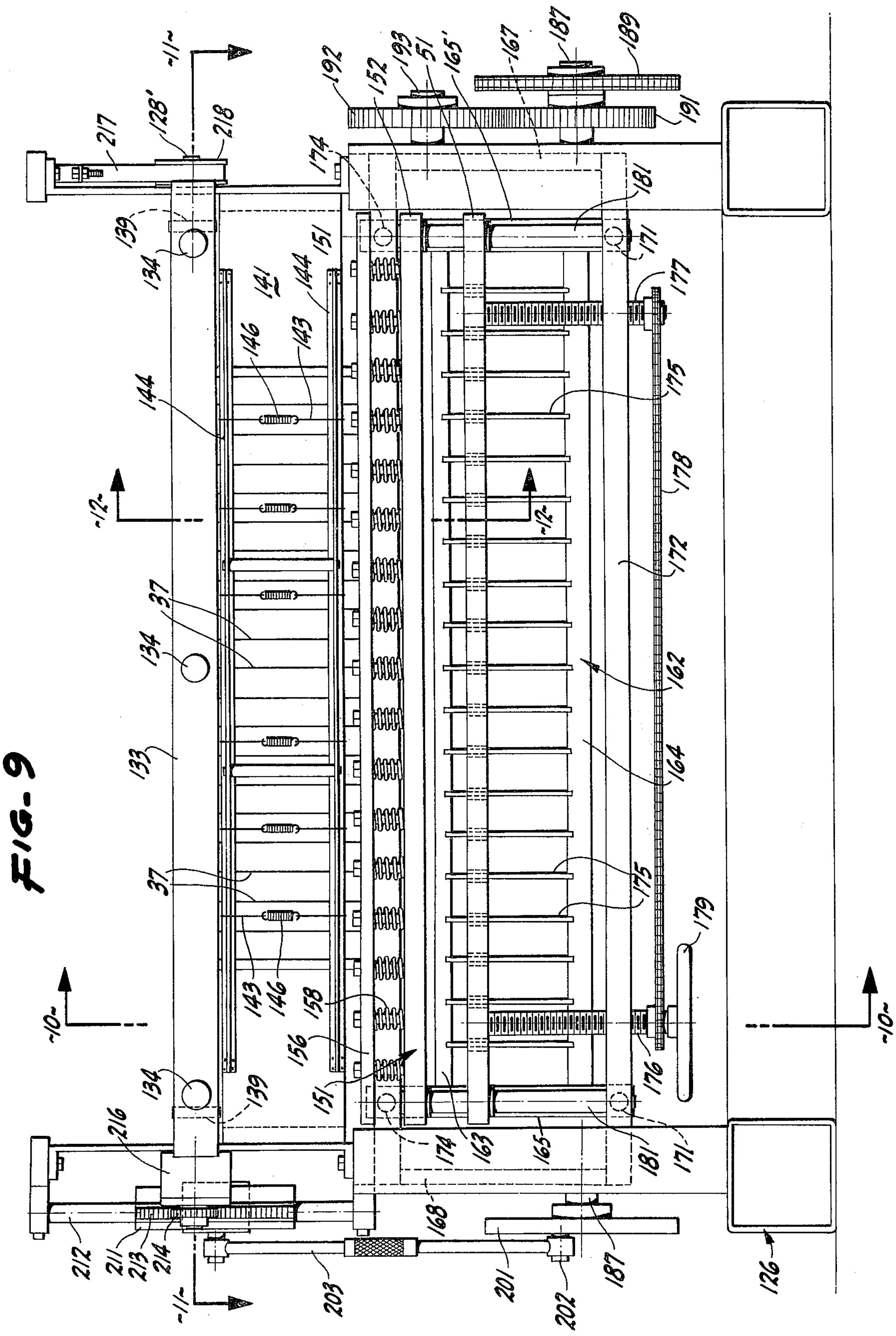
FIG. 9 is an end elevational view of the cutting station of the present invention.
Figure 12:
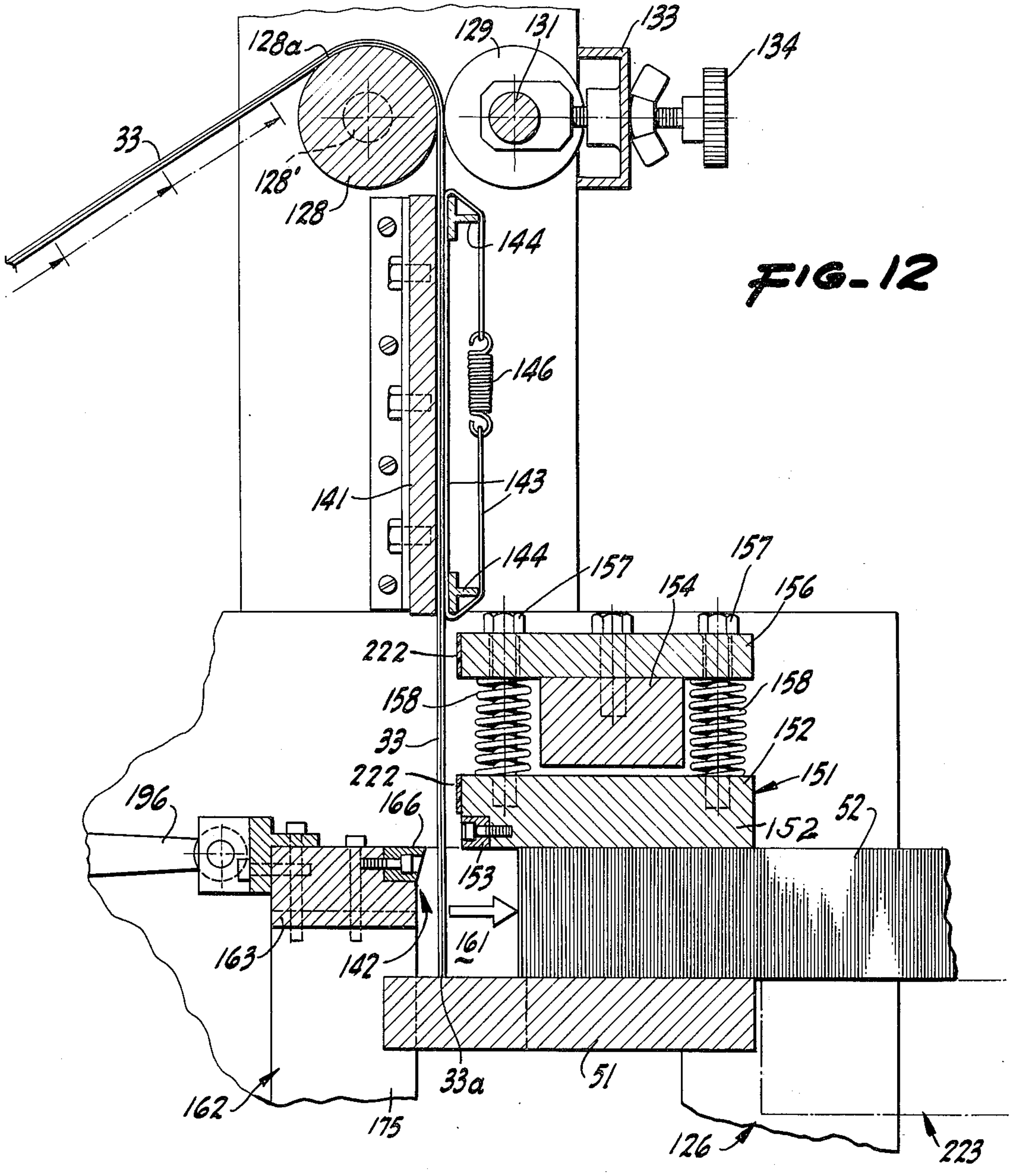
FIG. 12 is an enlarged partial sectional view taken in the plane 12—12 of FIG. 9.

Proceeding with a description of equipment of the system of the present invention, reference is made to FIGS. 8, 9 and 12 and sections thereof. The cutting and assembly station includes a frame 126 which may be formed separately from the frame 61 and secured thereto as indicated by the bolts 127 (FIG. 2) to form one rigid structure of the frame 61 and 126. Separation of the frames as indicated is desirable when the apparatus of the system is to be shipped or moved. It is, however, necessary that the entire frame structure be rigid and precisely aligned.

The intermittent drive means 48 includes a drive roller 128 mounted for rotation between upright side members of the frame 126. Cooperating with the drive roller 128 are a plurality of spaced drive discs 129 mounted upon a shaft 131 carried in bearing blocks 132 adjustably mounted on a rigid crosspiece 133 of the frame. An adjusting bolt 134 rotatably engages each bearing block and extends through the mounting piece 133 in threaded engagement therewith so that the bearing blocks, and thus the discs 129, may be moved toward and away from the drive roll 128. The web 33 extends over the top of drive roller 128 and then downward between this roller and the drive discs 129. The discs 129 are adjustably secured to the shaft 131 as by means of a collar on each disc with a setscrew therethrough, as illustrated in FIG. 11. The discs are disposed to engage the web between the lines of adhesive 37 thereon and the periphery of the discs may be knurled for gripping the web as it is driven by the intermittent drive means 48.

The drive roller 128 is mounted by means of a central shaft 128' thereof in end bearings 137 (FIG. 11) and is adpated to be driven by means described below. Gears 138 on each end of the shaft 128' mesh with gears 139 on the shaft 131 so that the drive roller 128 and discs 131 rotate in synchronism. The web 33 passing between the roller 128 and discs 129 is then directed in an upright position vertically downward to pass over a guide plate 141 (FIG. 12) mounted between uprights of the frame 126 and the web then passes into a cutting zone 142 incorporating the cutting means 49. There may be employed in conjuction with the guide plate 141 a plurality of guide lines 143 looped about brackets 144 disposed immediately in front of the guide plate at the top and bottom thereof and the lines 143 are maintained under tension by springs 146. These guide lines 143 then will be seen to resiliently press against the outer face of the web 33 as it passes over the guide plate 141 to assist in maintaining the web flat against the guide plate. The web slides over the guide plate 141 which is formed with a very smooth outer surface facing the web and may, for example, be formed of a hardwood which becomes glazed by the passage of the web thereover to form an extremely smooth, slick surface engaging the web. The guide lines 143 are disposed in alignment between glue lines 37 on the web 33, as shown in FIG. 9.

In the cutting zone 142 there is provided a first stationary cutter 151 which is particularly mounted to achieve a highly advantageous cutting action upon the web. This stationary cutter 151 includes a rigid elongated plate 152 having a cutting element 153 secured to the lower front face corner thereof, as best illustrated in FIG. 12. The first cutter 151 is precisely mounted by means of a rigid crossbar 154 secured to sides of the frame 126. A rigid mounting plate 156 is bolted to the top of the crossbar 154 and laterally overhangs the bar. A large number of mounting bolts 157 extends downwardly through the mounting plate 156 into threaded engagement with the cutter plate 152 with compression springs 158 disposed about the mounting bolts between the mounting plate 156 and plate 152. A large number of mounting bolts is employed and in the illustrated embodiment it will be seen that some thirty-four of such bolts extend through the mounting plate 156 into threaded engagement with the plate 152, with half of these bolts being provided on each lateral side of the crossbar 154. The bolts 157 are tightened so as to compress the springs 158 and thus align the first cutter plate 152 in precise horizontal disposition but with a limited vertical resiliency. The utilization of mounting bolts and springs on both sides of the crossbar 154 prevents tilting of the first cutter plate 152 and fixes this first cutter element 153 against any possible movement other than very limited resilient vertical displacement. It will be seen that the first cutter is mounted with a small clearance between crossbar 154 and the upper surface of the cutter plate 152 so that limited resilient vertical displacement of the first cutter is possible.

The above-described plate 152 serves not only to carry the stationary cutter 153 but also comprises a portion of the core assembly means of the present invention. The under surface of the plate 152 is machined to a precise planar configuration and, in fact, the entire plate is very precisely formed, drilled and tapped so that, in the illustrated mounted position, the under surface of the plate 152 is exactly horizontal, assuming the frame 126 is disposed on a horizontal surface. The plate 152 may thus be termed an upper assembly plate with the end plate or lower assembly plate 51 being disposed a predetermined distance beneath the upper assembly plate and also being formed with precisely machined surfaces, particularly as regards the upper surface thereof which is exactly planar. The lower assembly plate 51 is adapted to be engaged on the upper surface thereof by the lower edge of the web 33 as the web is fed downwardly into the cutting zone. To this end the plate 51 extends beneath the web and thus outwardly beyond the stationary cutter 153, again as best illustrated in FIG. 12. The lower assembly plate is adjustably mounted as described below and serves to define with the upper assembly plate 152 a core assembly area or volume 161.

Figure 10:
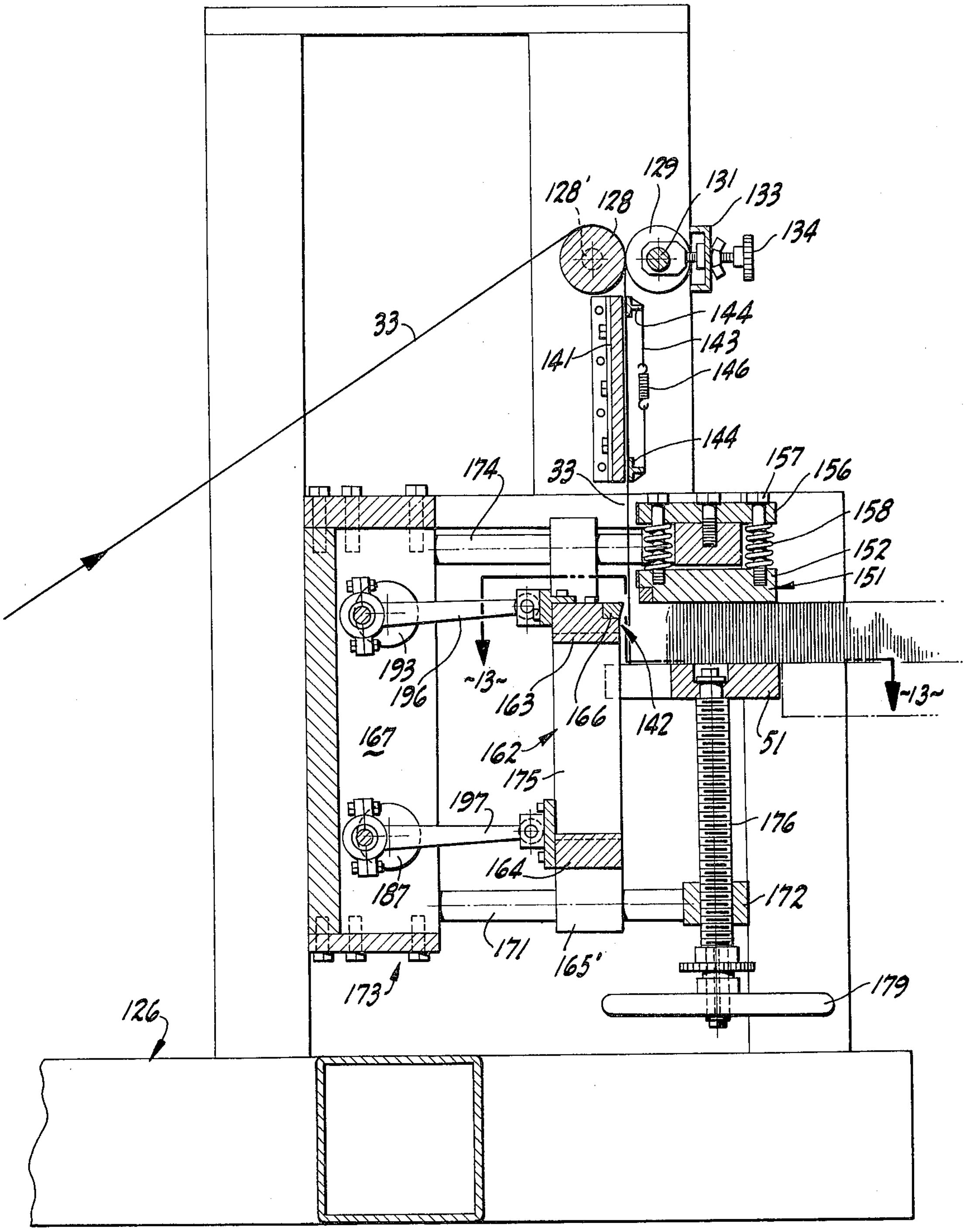
FIG. 10 is a vertical sectional view taken in the plane 10—10 of FIG. 9.

In the cutting zone 142 the web 33 is sliced or sheared into successive transverse web strips and to this end there is provided a movable carriage 162 carrying for movement therewith a cutter or blade 166 rigidly mounted on the upper forward corner. The horizontal upper surface of the movable cutter 166 is aligned with the horizontal lower surface of the stationary cutter 153 and the carriage 162 is mounted for reciprocation toward and away from the stationary cutter so as to move the movable blade into shearing engagement with the stationary blade. The carriage 162 may be formed as a pair of vertically spaced cross members 163 and 164 (FIG. 10) fixed between rigid upright end members 165 and 165'. The carriage rides slidably upon four horizontal shafts extending through the upright members 165 and 165' of the carriage. In FIG. 10 there is illustrated a lower shaft 171 rigidly mounted between a lower crossbar 172 of the frame and a rigid shaft housing 173 having upright end walls 167 and 168. An upper mounting shaft 174 extends horizontally between the upper crossbar 154 and the shaft housing 173. Similar mounting shafts are provided at each end of the carriage adjacent the upright side frame members and the rigid shaft housing 173 may be formed of a number of rigid plates secured together and mounted upon the upright side pieces of the frame. It will be seen that the carriage 162 is constrained against any movement except exact horizontal motion along the four mounting shafts therefor. There is additionally provided as a portion of the carriage 162 a plurality of vertically disposed and horizontally spaced parallel plates 175 secured between the upper and lower crosspieces 163 and 164 of the carriage. In this manner the upper crosspiece carrying the movable cutter element 166 is maintained in exact alignment without possibility of deflection, sagging, or the like.

The lower assembly plate 51 is precisely positioned as noted above and is horizontally adjustable by means illustrated in FIGS. 9 and 10. Such means may include a pair of vertical threaded shafts 176 and 177 threaded through the lower crossbar 172 and rotatably engaging the lower assembly plate 51. Each of the threaded shafts 176 and 177 is provided with sprocket wheels on the lower ends thereof with a chain 178 connected thereabout. A handwheel 179 secured to the lower end of the shaft 176 is provided to turn the shafts 176 and 177 to raise or lower the lower assembly plate 161. It will be appreciated that, with the lower assembly plate 161 aligned in precise horizontal disposition originally, any rotation of the handwheel 179 will only move this plate in a vertical direction. Further insurance against any possible tilting of the lower assembly plate in any direction is afforded by the provision of vertical guide bars 181 extending through the plate at opposite ends thereof and mounted between the upper crossbar 154 and lower crossbar 172.

Considering now the drive of the cutting and assembling station and referring first to FIG. 3, there will be seen to be provided a drive motor 186 mounted on the frame 126 and having a sprocket on an end of the shaft thereof connected by a sprocket chain 188 to a sprocket wheel 189 on the end of a lower crank shaft 187. The crank shaft 187 is mounted in bearings in extension through the shaft housing 173. A gear 191 secured to the crank shaft 189 meshes with a gear 192 upon a second or upper crank shaft 193 which also extends through the shaft housing 173. The two crank shafts 187 and 193 will thus be seen to rotate in synchronism. Each of the crank shafts is provided with offset portions as is conventional and upper and lower crank rods 196 and 197 are connected to the crank shafts 193 and 187 respectively and extend into pivotal engagement with the upper and lower crosspieces 163 and 164, respectively, of the carriage 162 as can be seen from FIG. 10. A plurality of upper and lower cranks 196 and 197 are provided in order to apply uniform forces to the carriage 162 and thus to ensure that the carriage moves smoothly along the mounting shafts thereof. In this manner there is provided further quarantee against any possible tilting or misorientation of the movable cutter element 166.

The intermittent drive mechanism 48 is also powered by the motor 186 through the lower crankshaft 187. An adjusting wheel 201 (FIG. 8) is mounted on an outer end of the crankshaft 187 for rotation therewith and on this wheel there is adjustably positioned a pivot mounting 202 for a drive bar 203. The mounting 202 is disposed in a diametrical slot 204 in the wheel 201 and micrometer adjusting and locking means 206 are provided for precisely locating and fixing the radial position of the mounting 202 on the wheel 201. In effect the adjusting wheel 201 provides a variable throw crank arrangement adjustable by the means 206 with the drive bar 203 then comprising the crank. The adjusting means 206 may, for example, comprise a threaded shaft disposed longitudinally of the slot 204 and secured to the mounting means 202. A pair of nuts are threaded on the shaft on opposite sides of a fixed bridge across the slot so that the longitudinal shaft position may be precisely set to fix the mounting means at a desired radium of the wheel 201.

Drive bar 203 which may be formed as an extensible element by a threaded connection, as illustrated, is pivotally mounted at the upper end thereof to a slide plate 211 slidably engaging a pair of parallel spaced vertical shafts 212 mounted on the frame 126. Thus it will be seen that rotation of the crankshaft will drive the slide plate 211 (FIGS. 8 and 9) up and down the vertical shafts 212 with the total movement of the slide plate being determined by the setting of the adjusting wheel 201. The slide plate 211 carries a rack or flat gear 213 engaging a gear 214 on a suitable precision one-way clutch mechanism 216 mounted on the frame 126 and engaging the end of roller shaft 128'. Movement of the slide plate upwardly by the stroke of the drive bar 203 thus rotates the gear 214 and this exact amount of rotation is transmitted to the shaft 128' so that the roller 128 is turned a precise angular amount. One way clutches of the type herein employed which are accurate to a fraction of a degree of angular movement are known in the art and one suitable clutch of this type is manufactured by Morse-Borg Warner under the name Duo-Cam clutch MI600. Downward movement of the slide plate 211 under the influence of the drive bar 203 rotates the gear 214 in the opposite direction; however, this motion is not imparted to the roller shaft 128' owing to the one-way action of the clutch 216. The shaft 128' is preferably braked to improve consistance of movement and this may be simply accomplished by extending a belt 217 in tension about a flanked disc 218 on the end of shaft 128', see FIGS. 3 and 9.

Figure 13:
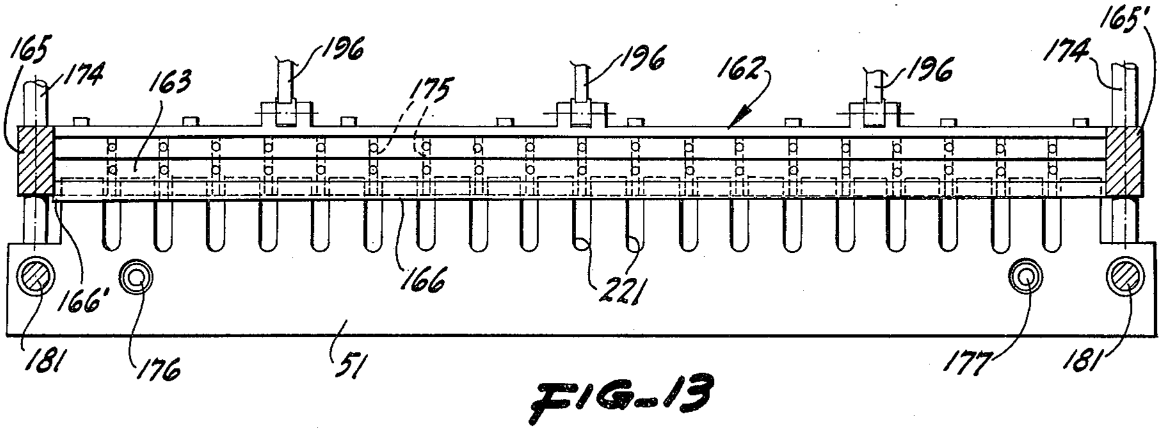
FIG. 13 is a horizontal sectional view taken in the plane 13—13 of FIG. 10.

Considering the cutting zone or section 142 somewhat further and referring to FIGS. 12 and 13, it will be seen that the lower assembly plate 51 is provided with slots 221 extending inwardly thereof from the carriage 162. These slots 221 are aligned with the upright plates 175 of the carriage 162 so that, when the carriage is reciprocated, the plates 175 move in and out of the slots 221 in the lower assembly plate 51. To obtain a shearing action the movable cutter element 166 is formed with a slightly inclined cutting edge, and in FIG. 13 this edge will be seen to extend further outwardly at 166' from the carriage at the left of the Figure than at the right. This inclined or tapered cutting edge provides for first engaging the lefthand corner of the cutter 166 with the stationary cutter 153 as the carriage is moved to the right in FIG. 12 and further movement of the carriage in this direction then causes the point of initial contact between the cutters to move to the right in FIG. 13. Such structure provides for a shearing action upon the web cut between the cutters rather than a chopping action and this has been found highly advantageous in assuring a clean, even cut.

Considering now operation of the cutting and assembling station 46, it is noted that the intermittent feed mechanism 48 provides for the movement or feed of a predetermined length of web into the cutting zone 142 and then the maintenance of the web in this position until this predetermined amount of web has been cut from the end of the web. The intermittent feed operation is powered by the motor 186 and operated through the adjusting wheel 201, drive bar 203 and one-way clutch 216. The length of web moved for each operation of the intermittent drive means 48 is precisely adjustable by the adjusting wheel 201. The amount of or length of web moved by each operation of the intermittent drive means is precisely equal to the separation between the lower surface of the upper assembly plate 152 and the upper surface of the lower assembly plate 51. This distance is the thickness of the cellular structure formed by the present invention.

As the web 33 moves downwardly into the cutting zone after a cutting operation and under the influence of the intermittent drive means 48, the end of the web will rest upon the upper surface of the lower assembly plate 51 in the position illustrated in FIG. 12. The carriage 162 is then driven to the right in FIG. 12 by the crankshafts 187 and 193 and pluralities of connecting rods 197 and 196, respectively. This moves the movable cutting element 166 to the right in FIG. 12 to force the web against the stationary cutting element 153 and then to shear the web at the line of engagement of the two cutters 153 and 166. The carriage continues to move to the right in FIG. 12 to thus force the cut strip of web between the assembly plates 152 and 51 into engagement with a prior cut strip of web held therebetween. As noted above, the assembly plates are precision ground and precisely mounted so that the space between these plates is exactly determinable. The cut strips of webs are thus tightly forced between these plates with the resilient mounting of the upper assembly plate 153 then providing for a force downwardly upon the strips of web as they are pressed together by the carriage.

Figure 14:
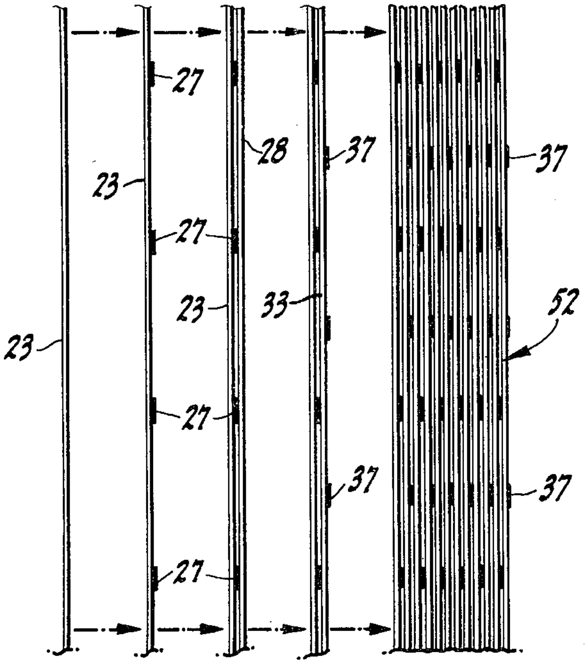
FIG. 14 is a diagrammatic representation of successive steps of the method of the present invention.

It will be appreciated that the outer surface of the web, i.e., the side to the right in FIG. 12, has lines of adhesive thereon and thus it is advantageous to provide a very slick surface on the inner sides of the plates 152 and 156 against which the web is pressed during shearing operations. Such surfaces may, for example, be formed by Teflon tape or the like 222. As the compressed core structure is formed between the assembly plates 152 and 51 this structure is moved to the right by the action of the carriage 162 and there may be provided a table or the like 223 (FIG. 2) upon which the continuously formed cellular structure or core is moved by the action of the present invention. It will be appreciated that as each cut strip of web is moved to the right in the cutting and assembling zone, it is forceably pressed against the prior cut strip therein so that successive strips are adhered together along the lines of adhesive of the strips as is illustrated in FIG. 14.

Figure 15:
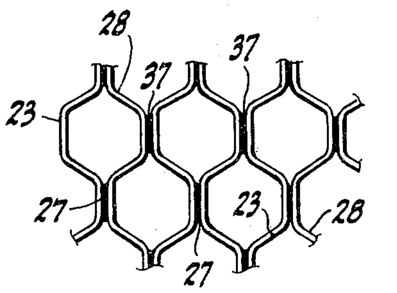
FIG. 15 is a partial plan view of a honeycomb core formed in accordance with the present invention.

It is particularly noted that the particular structure and mounting of the assembly plates and the cutting elements of the present invention provide a very precisely dimensioned cellular structure or core structure wherein the upper and lower surfaces thereof are exactly planar and parallel. This then precludes prior art necessity of smoothing these surfaces as by grinding, sanding, or the like. It is noted that, while there are various possible uses of a collapsed cellular structure, the same is particularly advantageous when expanded as shown in FIG. 15, as the core of a honeycomb structure having sheets of material applied on upper and lower expanded surfaces thereof in a conventional manner. Also, the apparatus can be operated at extremely high speeds, as high as 400 strokes per minute or more with extreme accuracy, which has not been accomplished by previous apparatus of such character.

There has been described above the operation of the glue application portion of the present invention and also the operation of the cutting and assembling portion. It is of particular importance to note, however, that the cooperation between these sections is quite critical. Prior art continuous core making machines have employed some type of slack forming and take-up mechanism directly adjacent the cutting means, in order to overcome the difficulties of intermittently driving large rolls of sheet material. Those systems wherein the web is wrinkled and/or formed into short waves adjacent the cutting means, as by continuous feed into a cutting zone, suffer at least from the disadvantage of possible creasing of the web and also relatively slow operating speeds. Any creasing of the web material is to be avoided and, for certain materials, such as thin metal sheet, any wrinkling or the like is destructive of the web to the point that the resultant cellular structure is defective.

The present invention, as generally illustrated in FIG. 1 of the drawings, will be seen to provide what has previously been termed herein a web reservoir 47 which may be considered as a surge section or unrestrained free loop of web material from which the intermittent drive withdraws web as required. This free, preformed loop 47 extends generally horizontally between the nip of tensioning means 38 and the initial line of contact (at 128*a* FIG. 12) of the web with the intermittent positive-feed drive roller 128. The length of this web reservoir section is considerably greater than the straight line distance between the two aforementioned locations. Such excess length is not particularly critical as long as it is greater than the width of the web strips being cut, preferably at least about 3 times such width to ensure free suspension of the web section. Thus, with a continuous feed drive of the web 53 by main drive rollers 31, 32, when feed of the leading edge of the web indicated at 33*a* in FIG. 12 is blocked by plate 51 in the cutting zone, wave formation or wrinkling would normally occur directly above the cutting zone.

In the instant invention, this cannot occur because during the time the web is being cut, the drive of the web by intermittent drive roll 128 is interrupted, so that feeding of the web beyond the intermittent drive roll does not occur, and consequently such wave formation or wrinkling is precluded. During the cutting phase when the intermittent drive 48 is at rest, the web is continuously fed by the continuously driven main drive rolls 31, 32, thus increasing the length of loop section 47 an amount equal to the width of the strips being transversely cut. When the cutting phase is terminated and driving of the intermittent drive begins, such excess length (equal to the strip width) is removed from the loop by the intermittent drive. Thus, the loop section 47 also acts as a surge section to accommodate these fluctuations.

It is immaterial how much excess web is preformed and maintained in the reservoir section because the amount of web fed to the cutter is determined solely by the positive intermittent drive. The web section of preformed loop 147 which forms the surge section, is unrestrained because it has sufficient excess length so that at no time is it tensioned or pulled taut by the intermittent drive mechanism; and, since the dancer roll 53 merely floats on the web loop section 47, it does not impart tension thereto from the intermittent drive mechanism.

It is to be particularly noted that in the present invention the intermittent drive means is the sole control over the length of web driven into the cutting zone, and thus the web length is precisely set equal to the width of strips being cut. The intermittent drive then stops until the web has been cut and the cutting knife retracted, whereupon another strip-length of the web is fed into the cutting zone. This is done periodically.

In cooperation with the aforementioned flat guide plate 141, the web is always flat the entire distance between the intermittent drive and the cutting zone. This ensures accuracy of the cutting and enables high speed operation. The free loop section 47 provides a reservoir or surge section to accommodate change in length of the web section 47 as it is being continuously fed to the intermittent drive zone during the period the web is being cut and therefore not driven by the intermittent drive. During this cutting period, it will be noted that under no circumstances is there any possibility of wrinkles or the like being formed in the web even though the forward portion of the present system operates on a continuous feed and the cutting and assembling portion operates on intermittent feed. Since the excess of web length provided in the reservoir 47 is substantially greater than the length of web material sheared in each cutting operation, it is not possible for the web to be drawn tightly between the end of the continuous feed portion and the intermittent feed mechanism. This precludes difficulties in web control.

Figure 2:
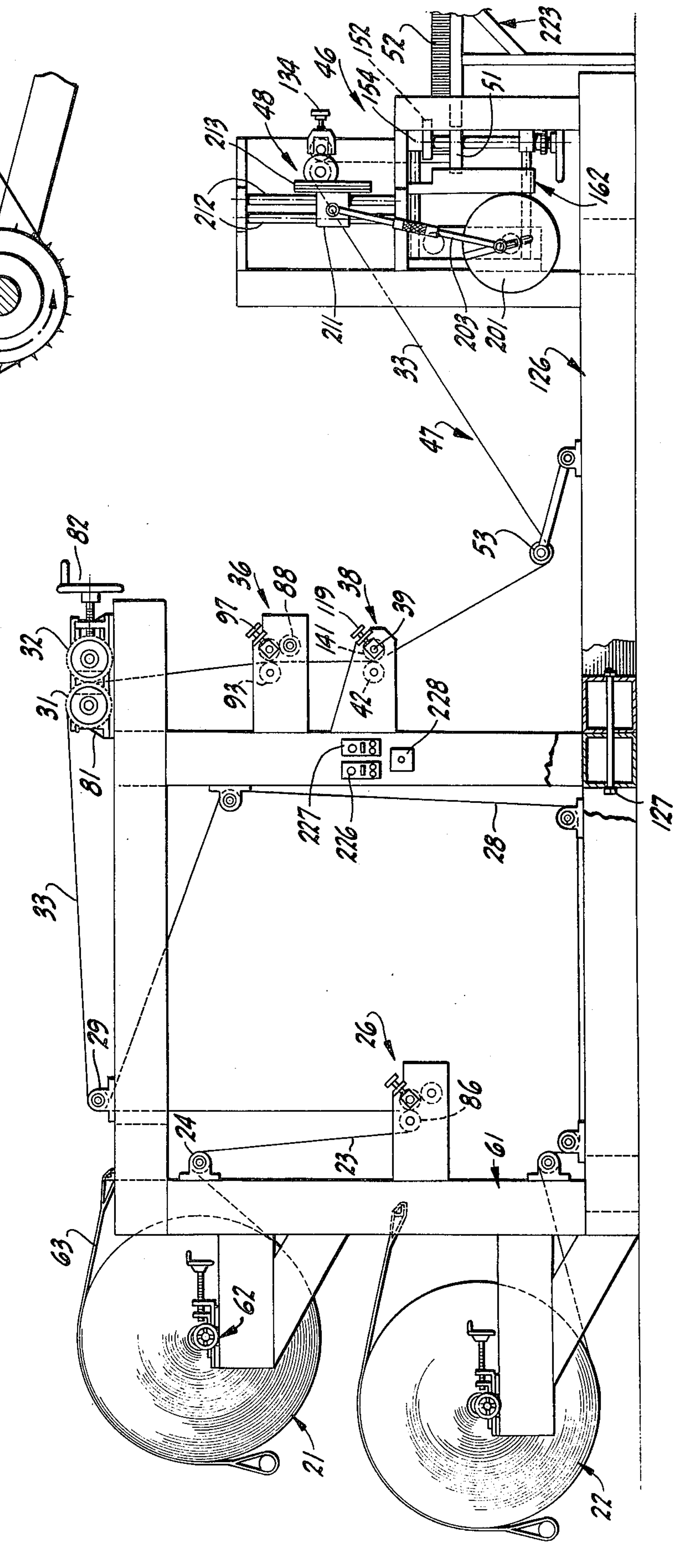
FIG. 2 is a side elevational view of a preferred embodiment of the present invention.

In operation the web is initially threaded through the machine to form a preformed loop section, and the speeds of the drive motors 66 and 186 are adjusted by an operator so that a desired length of web loop 47 extends between the tensioning means 38 and intermittent drive means 48. In FIG. 2 there is schematically illustrated motor drive control means 226 and 227 mounted on the frame 61 in a position for utilization by an operator to start up the motors and control the speeds thereof so that a desired loop of web extends between the adhesive applying portion of the system and the cutting and assembly portion. It is also possible to provide a synchronous control 228 whereby the speed of each of the motors may be increased and decreased in proportion to the original speed settings thereof without individually adjusting each motor speed. Motor speed control means and synchronizing means are known in the art, and are thus not further described herein.

In the preferred embodiment of the invention illustrated in the drawings, the apparatus is composed of three sections, namely the laminating or web combining section in which adhesive is applied and which terminates at the tensioning and drive means 38, the loop maintaining section 47, and the cutting and assembly section commencing with the intermittent drive means 48. It is apparent that the web may be laminated beforehand in a separate apparatus and wound into a supply roll. Then later this laminated web may be continuously fed from the supply roll to a web cutting and assembly section 48 of the type described, while the loop section 47 is maintained ahead of the cutting and assembly section to obtain the advantageous results of applicant's apparatus and method.

I claim:

1. Apparatus for making a cellular core structure from a web composed of plies of flexible sheet material, comprising a ply laminating section and a section in which the web is cut into transverse strips of predetermined width and assembled together; the laminating section comprising means for applying first lines of adhesive to a face of one of the plies, means for adhering said ply to a second ply along said lines of adhesive including continuously driven drive rolls which continuously withdraw said plies from supply sources thereof to form said web, web tensioning and drive means following said drive rolls, and means located between said drive rolls and said web tensioning and drive means for applying second lines of adhesive to an outer face of the web between the first lines of adhesive; the web cutting and assembly section comprising means intermittently operable to cut transverse strips from the web of predetermined width, and intermittent drive means ahead of said cutting means for intermittently feeding said web to the cutting means in accordance with the width of said strips; and means for continuously maintaining the section of the web between said web tensioning and drive means and said intermittent drive means in the form of a preformed loop having a length in excess of the distance between said intermittent drive means and said web tensioning and drive means.

2. The apparatus of claim 1 wherein adhesive applying means comprises an adhesive applicator roll engaging a web ply to transfer adhesive thereto, and a doctor blade having spaced apart slots engaging the roll to wipe adhesive from said roll except in the area of the slots to thus form such lines of adhesive.

3. The apparatus of claim 1 wherein the intermittent drive means comprises rotatably mounted drive roller and drive discs adapted to have said web extend therebetween for engagement thereby, a continuously rotated wheel having a drive bar pivotally connected thereto at an adjustable radial distance from the center thereof, and connecting means engaging said drive bar and connected through a precision one-way clutch to said drive roller whereby said drive roller is periodically rotated through a controllable angle to periodically advance said web a controllable distance.

4. The apparatus of claim 1 wherein the cutting means comprises an end plate spaced from said intermittent drive means an adjustable distance beneath same for engaging the end of the web fed into the cutting means by said intermittent drive means, a stationary cutter element disposed between said intermittent drive means and said end plate in extension laterally across said web in fixed relation to said intermittent drive means, a movable cutter disposed in alignment with said stationary cutter on the opposite side of said web therefrom and mounted upon a carriage, a pair of rotatably mounted driven crankshafts having cranks thereon extending from said shafts into pivotal engagement with said carriage for reciprocation of said carriage and movable cutter in precise alignment with said stationary cutter element.

5. The apparatus of claim 1 wherein the assembly means of said web cutting and assembly section comprises a rigid end plate disposed in line with said web extending from said intermittent drive means and adjustably mounted parallel to axes of said drive means on a rigid frame and precisely adjustable in a direction perpendicular to the mounting plane thereof, an upper cutter element including a flat rigid upper assembly plate mounting a stationary cutter and disposed in spaced parallelism with said end plate, means mounting said upper assembly plate on said frame including a large plurality of compression springs spaced along said latter plate for resilient mounting of same to press against severed slices of said web moved between said upper assembly plate and said end plate and movable cutting means including a carriage movable between said end plate and said stationary cutting element for pushing severed web sections therebetween against previously severed sections therein.

6. Apparatus for making a cellular core structure from a web composed of plies of flexible sheet material comprising a laminating section and a cutting and assembly section in which the web is cut into transverse strips of predetermined width and assembled together; said laminating section comprising means for applying first lines of adhesive to a face of one of said plies, means for adhering said ply to a second ply along said lines of adhesive including continuously driven drive rolls which continuously withdraw said plies from supply sources thereof to form a web of said plies, web tensioning means following said drive rolls, and means located between said drive rolls and said web tensioning means for applying second lines of adhesive to a face of said web between the first lines of adhesive; said web cutting and assembly section comprising intermittent drive means including a rotatably mounted drive roller and drive discs adapted to have said web extend therebetween for engagement thereby, a continuously rotated wheel having a drive bar pivotally connected thereto at an adjustable radial distance from the center thereof, and connecting means engaging said drive bar and connected through a one-way clutch to said drive roller whereby said drive roller is periodically rotated through a controllable angle to periodically advance said web a controllable distance, and cutting means following said intermittent drive means and periodically operable to shear transverse strips of predetermined width from the end of the web; and means for continuously maintaining the section of the web between said web tensioning means and said intermittent drive means in the form of a preformed loop having a length in excess of the distance between said intermittent drive means and said web tensioning means.

7. Apparatus for making a cellular core structure from a web composed of flexible sheet material comprising a ply laminating section including means for applying first lines of adhesive to a face of one of said plies, means for adhering said ply to a second ply along said lines of adhesive including continuously driven drive rolls which continuously withdraw said plies from supply sources thereof to form said web, web tensioning means following said drive rolls, and means located between said drive rolls and said web tensioning means for applying second lines of adhesive to a face of said web between the first lines of adhesive; a web cutting and assembly section comprising intermittent drive means for intermittently feeding said web to cutting means in accordance with the width of said strips, an end plate spaced from said intermittent drive means an adjustable distance beneath same for engaging the end of the web fed into the cutting means by said intermittent drive means, and said cutting means including a stationary cutter element disposed between said intermittent drive means and said end plate in extension laterally across said web in fixed relation to said intermittent drive means, a movable cutter disposed in alignment with said stationary cutter on the opposite side of said web therefrom and mounted upon a carriage, a pair of rotatably mounted driven crankshafts having cranks thereon extending from said shafts into pivotal engagement with said carriage for reciprocation of said carriage and movable cutter in precise alignment with said stationary cutter element; and means for continuously maintaining the section of the web between said web tensioning means and said intermittent drive means in the form of a preformed loop having a length in excess of the distance between said intermittent drive means and said web tensioning and drive means.

* * * * *